June 7, 1927.
I. H. JUDD
1,631,135
LANDING AND RAISING GEAR FOR SEMITRAILERS
Filed Aug. 24, 1925
2 Sheets-Sheet 1
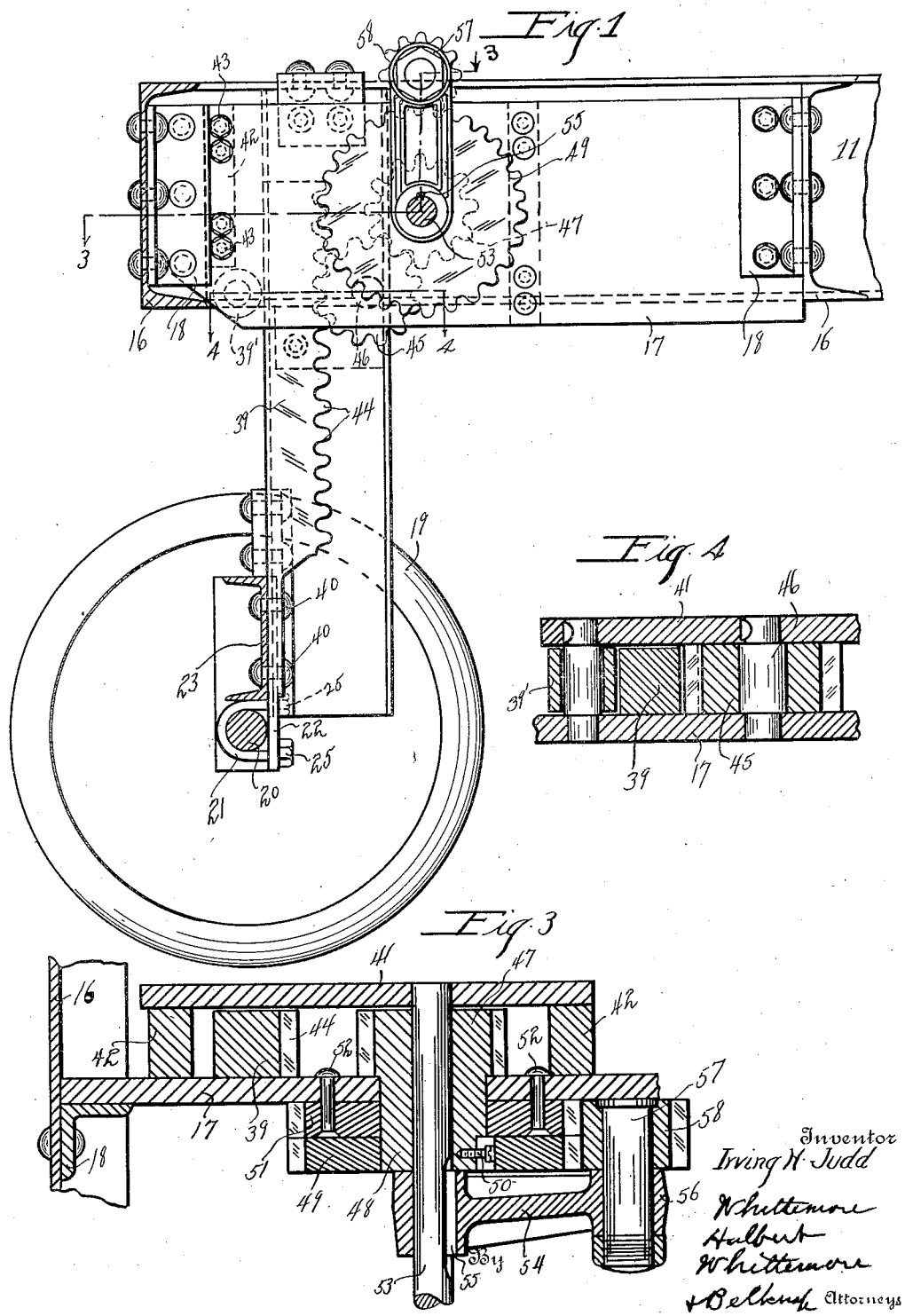

June 7, 1927. 1,631,135
I. H. JUDD
LANDING AND RAISING GEAR FOR SEMITRAILERS
Filed Aug. 24, 1925 2 Sheets-Sheet 2
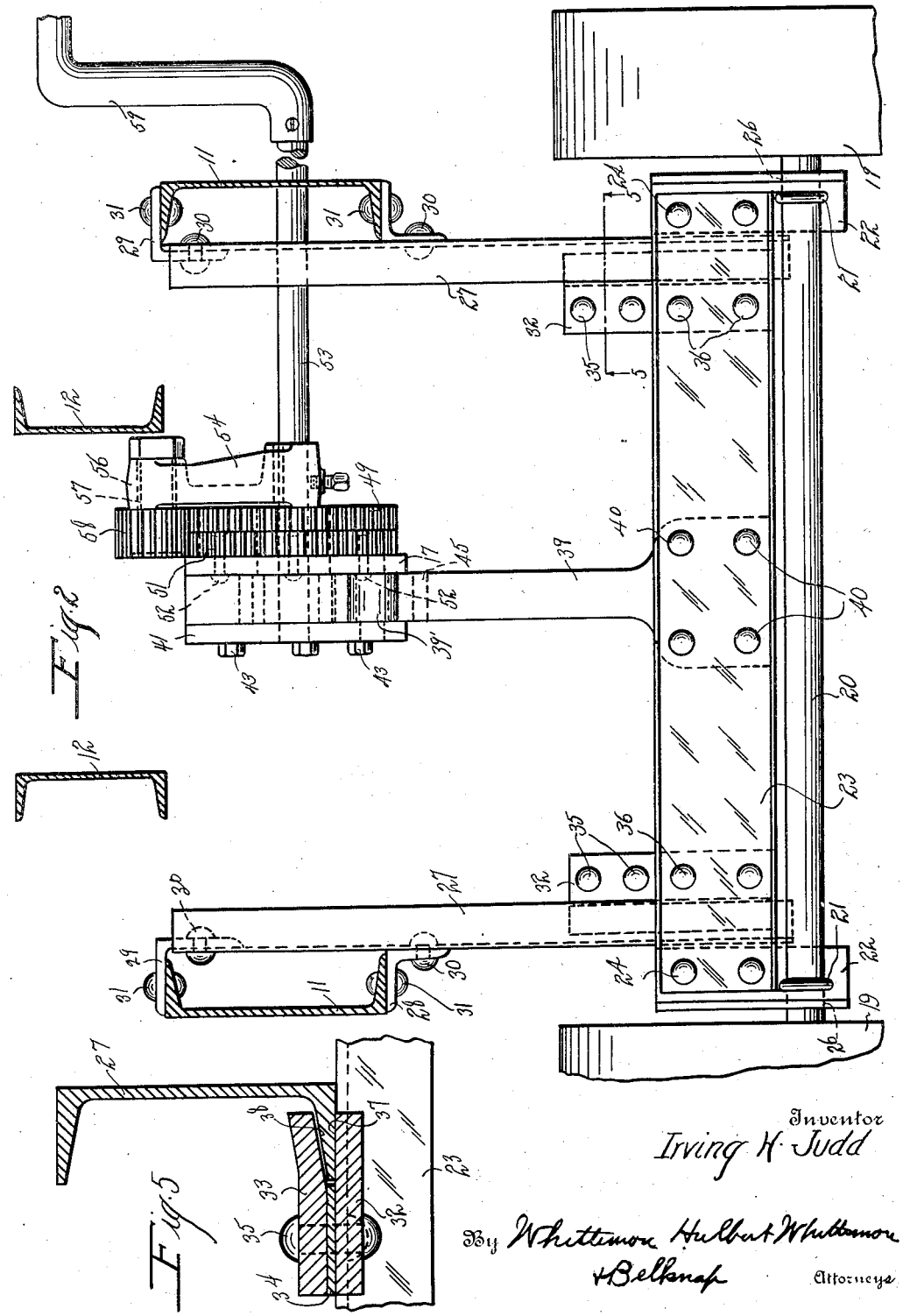
Inventor
Irving H. Judd
By Whittemore Hulbert Whittemore
+Belknap Attorneys Patented June 7, 1927.

1,631,135

UNITED STATES PATENT OFFICE.

IRVING H. JUDD, OF DETROIT, MICHIGAN, ASSIGNOR TO WHITEHEAD AND KALES, INC., OF RIVER ROUGE, MICHIGAN, A CORPORATION OF MICHIGAN.

LANDING AND RAISING GEAR FOR SEMITRAILERS.

Application filed August 24, 1925. Serial No. 52,245.

This invention relates to landing and raising gear for semi-trailers wherein means are provided for raising and lowering the forward portion of the trailer by means of adjustable ground engaging elements or feet.

The invention has, among its objects, to simplify, render more efficient, and improve generally devices of this character and to this end consists in the novel combination, arrangement and construction of parts described in the accompanying specification and illustrated in the drawings; wherein—

Figure 1 is an enlarged side elevation, partly in section, of the front of the trailer, Figure 2 is a front elevation, partly in section, of the structure shown in Figure 1, Figure 3 is a detailed horizontal sectional view taken substantially on the plane indicated by the line 3—3 in Figure 1, Figure 4 is a detailed sectional view taken substantially on the plane indicated by the line 4—4 in Figure 1, and Figure 5 is a detailed sectional view taken substantially on the plane indicated by the line 5—5 in Figure 2.

Referring now particularly to the drawings wherein like reference characters indicate like parts, it will be noted that the trailer includes frame members 11, longitudinal frame members 12, a body (not shown) and a pair of ground-engaging wheels mounted upon the frame 11, in any suitable manner, adjacent the rear thereof. The frame bars 12 extend beyond the main frame 11 at the forward end of the trailer and carry a coupling plate or tongue (not shown), by means of which the trailer may be attached to a tractor or other suitable propelling device. The trailer structure thus far described is only conventionally illustrated herein and may be of any suitable or desired construction, it being apparent as this description proceeds, that the details of construction of the trailer do not affect the operation of the invention about to be described.

Arranged in spaced relation and transversely with reference to the forward ends of the frame members 11 is a pair of channel bars 16, these bars extending horizontally at right angles to the frame bars 11 and being suitably bolted thereto. Upon these channel bars 16 and extending therebetween is a supporting plate 17 providing supporting bearings for a train of gears, yet to be described, by which the raising and lowering of the adjustable ground engaging wheels is effected. The plate 17 is preferably secured to the channel bars 16 by means of angle irons 18 which have their angularly arranged flanges bolted respectively to the channel bars 16 and the ends of supporting plate 17.

The adjustable ground engaging wheels 19 are rotatably supported upon an axle 20 secured by U-shaped bolts or clips 21 to axle supporting plates 22 bolted to the ends of a channel bar 23 which extends transversely of the trailer. The axle supporting plates 22, are, as shown, preferably in the form of angle bars and are riveted as at 24 to the channel bar 23. The ends of the U-bolts 21 pass through the axle supporting plates 22 and are threaded to receive clamping nuts 25. The angular portion of the axle supporting plates 22 arranged transversely to the axis of the axle 20 are apertured as at 26, and the ends of the axle are passed therethrough. Thus the axle 20 is securely supported upon channel bars 23.

The axle frame or channel bar 23 is slidably supported upon vertically arranged channel-shaped guide bars 27 rigidly mounted upon frame bars 11, as clearly shown in Figure 2. For this purpose angle plates 28 and 29 are provided which are secured, preferably by riveting, as at 30, to guide bars 27, and as at 31 to the sides of frame bars 11. For guidingly and slidingly connecting axle frame 23 to these guide bars 27 there is provided in connection with each bar 27, a pair of plates 32 and 33 separated by a spacer plate 34 riveted together as at 35, the plate 32 preferably abutting the upper flange of axle frame 23, while plate 33 extends adjacent the back of frame bar 23 and is riveted thereto as at 36. The free edge of plate 32 engages the outer plane face 37 of the flange of guide bar 27, while the free edge of plate 33 is inclined to engage the inner inclined face 38 of this flange. Inasmuch as this construction is duplicated at both ends of the axle frame 23 it follows that this frame, together with the axle 20 and the ground engaging wheels 19 are guidingly and slidably supported for vertical reciprocation on these guide bars 27.

The frame bar 23 and the appurtenant parts are supported and adjusted by means of the adjusting bar 39 in the form of a rack bar secured as at 40 by riveting to the web of axle frame 23. This bar extends vertically and between supporting plate 17 and a supplemental supporting plate 41 spaced therefrom by spacing blocks 42 and secured thereto by any suitable means such as bolts 43. The space between the main supporting plate 17 and supplemental plate 41 is sufficient to guidingly receive bar 39, which also engages a guiding roller 39'.

One face of the bar 39 is formed with a plurality of rack teeth 44 adapted to mesh with a pinion 45 journaled on a shaft 46 which in turn meshes with a pinion 47 preferably integral with a sleeve 48. A gear 49 is secured to the sleeve 48 to rotate therewith as by means of a key 50, and arranged adjacent to this gear is a second gear 51 of the same diameter, having gear teeth of the same pitch as those of the gear 49 but having one tooth less than the gear 49. The gear 51 is secured to supporting plate 17 in any suitable manner herein shown as by rivets 52, and constitutes the stationary gear of the gear pair 49—51.

Starting approximately at the center and extending transversely of the vehicle, as clearly illustrated in Figure 3, is an operating shaft 53. The inner end of this shaft is journaled in supplemental supporting plate 41, this shaft passing through sleeve 48 and being journaled adjacent its outer end in frame bar 11. Arranged on this shaft adjacent the gear pair 49—51 is an arm 54 keyed to the shaft 53 as at 55 and provided at its outer end with a boss 56 carrying a stub shaft 57 on which is mounted a planetary gear 58 of a width equal to the combined width of the gear pair 49—51 and with the teeth thereof meshing with the teeth of this gear pair. The operating shaft 53 is adapted to be rotated by means of a crank handle 59 engageable with the outer end of this shaft and when shaft 53 is rotated arm 54 will consequently be rotated with the shaft 53 as its axis, whereupon planetary gear 58 will be rotated about the gear pair 49—51. As was heretofore mentioned gear 51 is stationary while gear 49 which has one tooth more than gear 51 is rotatable. Hence during one complete rotation of planetary gear 58 gear 49 will rotate a distance equal to one tooth space, and will consequently impart this rotary movement to sleeve 48, and thence through gear train 47 and 45 to operating rack 39, whereupon ground engaging wheels 19 will either be raised or lowered according to the direction of movement of the gear train.

With the above described arrangement of gearing it will be readily apparent that a powerful working effort may be transmitted to the rack 39 with the expenditure of only a small effort. Hence the forward end of the semi-trailer may be raised or lowered very easily. It will also be readily apparent that this gear arrangement is inherently self-locking so that the crank handle may be released at any time and the gearing will sustain the load.

In practice the rear ground engaging wheels of the semi-trailer are always on the ground and sustain the load, it being customary in this character of trailer to withdraw the forward ground engaging wheels 19 from engagement with the ground after the coupling tongue 15 has been connected to the tractor or other propelling device. With the herein described gear train for raising and lowering the forward wheels 19 it is possible, even when the trailer is loaded, to raise and lower the forward end sufficiently to facilitate the engagement or disengagement of the coupling tongue with the tractor with a minimum amount of effort. The arrangement has the advantage that the gear train is inherently self-locking so that when necessary the forward wheels 19 may be also used as load sustaining wheels.

The construction herein described is distinguished by its simplicity, rigidity, and durability, it being noted that practically all of the frame and supporting elements are formed of channel or angle bars capable of resisting torsional, lateral, and longitudinal strains. In a construction of this character the assembling of the device is also facilitated.

While one embodiment of the invention has been illustrated and described herein in some detail it will be immediately apparent to those skilled in this particular art that various changes and modifications may be resorted to without departing from the spirit and scope of this invention and to this end reservation is made to make such changes as may come within the purview of the accompanying claims.

What I claim as my invention is:

1. In a semi-trailer construction, a pair of ground engaging wheels, means adjustably supporting said wheels, and adjusting means therefor, including, a rack, a planetary gearing and a train of gears connecting said rack and planetary gearing.

2. In a semi-trailer construction, a pair of ground engaging wheels, means adjustably supporting said wheels, and adjusting means therefor, including, a rack, a self-locking planetary gearing and a train of gears connecting said rack and planetary gearing.

3. In a semi-trailer construction, a ground engaging element, means adjustably supporting said element, and adjusting means therefor, including, a rack, a power multiplying planetary gearing and a train of gears connecting said rack and planetary gearing.

4. In a semi-trailer construction, a ground engaging element, means adjustably supporting said element, and adjusting means therefor, including, a rack, a self-locking, power increasing planetary gearing and a train of gears connecting said rack and planetary gearing.

5. In a semi-trailer construction, a pair of ground engaging wheels, means adjustably supporting said wheels, adjusting means therefor comprising, a train of gears including a planetary gearing and manually operated means for actuating the planet gear of said planetary gearing.

6. In a semi-trailer construction, a pair of ground engaging wheels, means adjustably supporting said wheels, adjusting means therefor comprising, a train of gears including a power multiplying planetary gearing and manually operated means for actuating the planet gear of said planetary gearing.

7. In a semi-trailer construction, the combination with longitudinal frame bars thereof, of transversely arranged frame bars, a supporting plate mounted on said latter frame bars, vertical guide bars carried by said first mentioned frame bars, wheels, a wheel frame, means carried by said wheel frame and engaging said guide bars for slidably mounting said wheel frame, a gear train, including a power increasing planetary gearing, supported by said supporting plate and means connecting said axle frame to said gear train for adjusting the former.

8. In a semi-trailer construction, the combination with longitudinal frame bars thereof, of transversely arranged frame bars, a supporting member mounted on said latter frame bars, vertical guide bars carried by said first mentioned frame bars, a supplemental supporting plate secured in spaced relation to the supporting member aforesaid, a pair of wheels slidably engaging said guide-bars, a train of gears including a planetary gearing mounted on said supporting member and means for adjustably connecting the axle frame to said gear train including a rack having one end secured to said axle frame and the opposite end slidably mounted between the supporting member and supplemental plate.

9. In a semi-trailer construction, a frame carried by the trailer, a pair of wheels, depending guide bars secured to said frame, an axle frame for said wheels slidably mounted on said guide bars, a rack rigidly secured to said axle frame, and means for actuating said rack for adjusting the axle frame including a self-locking power increasing planetary gearing and a train of gears connecting said rack and planetary gearing.

10. In a semi-trailer construction, a frame carried by the trailer, a pair of adjustable wheels mounted forwardly of the trailer, an axle frame for said wheels, a pair of depending guide bars having one end secured to the first mentioned frame and the opposite end slidably engaging the axle frame adjacent the ends thereof and means for guidingly connecting said axle frame to said guide bars including a pair of plates secured in spaced relation to said axle frame and having a portion receiving one edge of said guide bars.

11. In a semi-trailer construction, a frame carried by the trailer, a pair of adjustable wheels mounted forwardly of the trailer, an axle frame for said wheels, a pair of depending guide bars adjustably connecting said axle frame to the frame aforesaid, means for adjusting the axle frame including a rack rigidly secured to said axle frame intermediate the ends thereof, a self locking power increasing planetary gearing and a train of gears connecting said rack and planetary gearing.

12. In a semi-trailer construction, a frame carried by the trailer, an axle frame positioned substantially below and slidably carried by the frame aforesaid, a pair of ground engaging wheels disposed upon opposite sides of said axle frame, and means for adjusting the sliding movement of said axle frame including, a rack secured to the last mentioned frame, a power multiplying planetary gearing and a train of gears connecting said rack and planetary gearing.

13. In a semi-trailer construction, a frame carried by the trailer, an axle frame positioned below and adjustable with respect to the frame aforesaid, a pair of ground engaging wheels disposed upon opposite sides of said axle frame, and means for adjusting the last mentioned frame including, a rack rigidly secured to said axle frame intermediate the ends thereof, a self-locking power increasing planetary gearing, a train of gears connecting said rack and planetary gearing and manually operated means for actuating the planet gear of said planetary gearing.

In testimony whereof I affix my signature.

IRVING H. JUDD.